United States Patent
Ananian et al.

(10) Patent No.: US 6,377,320 B1
(45) Date of Patent: Apr. 23, 2002

(54) SIZE-ADJUSTABLE MOUNTING FRAME FOR TELEVISION SCREEN PROTECTOR

(76) Inventors: Fredrick Ananian, 27102 Hidden Trail Rd.; John Ananian, 25296 Hillary La., both of Laguna Hills, CA (US) 92653

( * ) Notice: Subject to any disclaimer, the term of this patent is extended or adjusted under 35 U.S.C. 154(b) by 0 days.

(21) Appl. No.: 09/512,897

(22) Filed: Feb. 25, 2000

(51) Int. Cl.[7] .............................. H04N 5/64; A47G 1/10; A47B 81/06
(52) U.S. Cl. .......................... 348/836; 40/783; 312/7.2
(58) Field of Search ................................ 348/832, 836, 348/823, 834; 312/7.2; 40/783, 784, 799, 739, 741

(56) References Cited

U.S. PATENT DOCUMENTS

| | | | |
|---|---|---|---|
| 696,935 A | * | 4/1902 | Buechner ..................... 40/783 |
| 3,418,426 A | | 12/1968 | Schlegel |
| 3,451,153 A | * | 6/1969 | Dohanyos ................. 40/783 X |
| 3,936,968 A | * | 2/1976 | Gilbert ........................ 40/783 |
| 4,045,818 A | | 8/1977 | Wilhelm |
| 4,177,484 A | | 12/1979 | Boje |
| 4,246,613 A | | 1/1981 | Choder et al. |
| 4,356,648 A | * | 11/1982 | Beaulieu ..................... 40/783 |
| 4,427,264 A | | 1/1984 | Kamerling |
| 4,504,867 A | | 3/1985 | Keller |
| 4,628,365 A | | 12/1986 | Carlton |
| 4,652,085 A | | 3/1987 | Selling et al. |
| 4,788,597 A | | 11/1988 | Gart et al. |
| 4,819,085 A | | 4/1989 | Liang |
| 4,907,090 A | | 3/1990 | Ananian |
| 4,986,013 A | * | 1/1991 | Pollack ........................ 40/783 |
| 5,299,017 A | * | 3/1994 | Furuno ................... 312/7.2 X |
| 5,515,630 A | * | 5/1996 | Maher ......................... 40/739 |
| 5,580,145 A | * | 12/1996 | Yamada et al. ......... 348/836 X |

FOREIGN PATENT DOCUMENTS

JP 0090722 8/1978

* cited by examiner

Primary Examiner—James O. Hansen
(74) Attorney, Agent, or Firm—Stetina Brunda Garred & Brucker

(57) ABSTRACT

A size adjustable mounting frame for encompassing a television screen protector and for fastening the so-framed screen protector to a television housing to extend over the television projection screen. The adjustable mounting frame includes a plurality of frame members equal to the number of longitudinal edges of the television screen protector. Each of the frame members has a first end, a second end, at least one engager for attaching the frame member to an edge of the screen protector, and at least one retainer member for attaching the frame member to a television housing receptor member. The adjustable mounting frame also includes a plurality of angled connector members for connecting adjacent respective end portions of adjacent frame members to each other. Each connector member includes a first end a second end, such that each end thereof is configured to slideably accept a selected length of the end portion of one frame member in accord with the size of the screen protector.

2 Claims, 5 Drawing Sheets

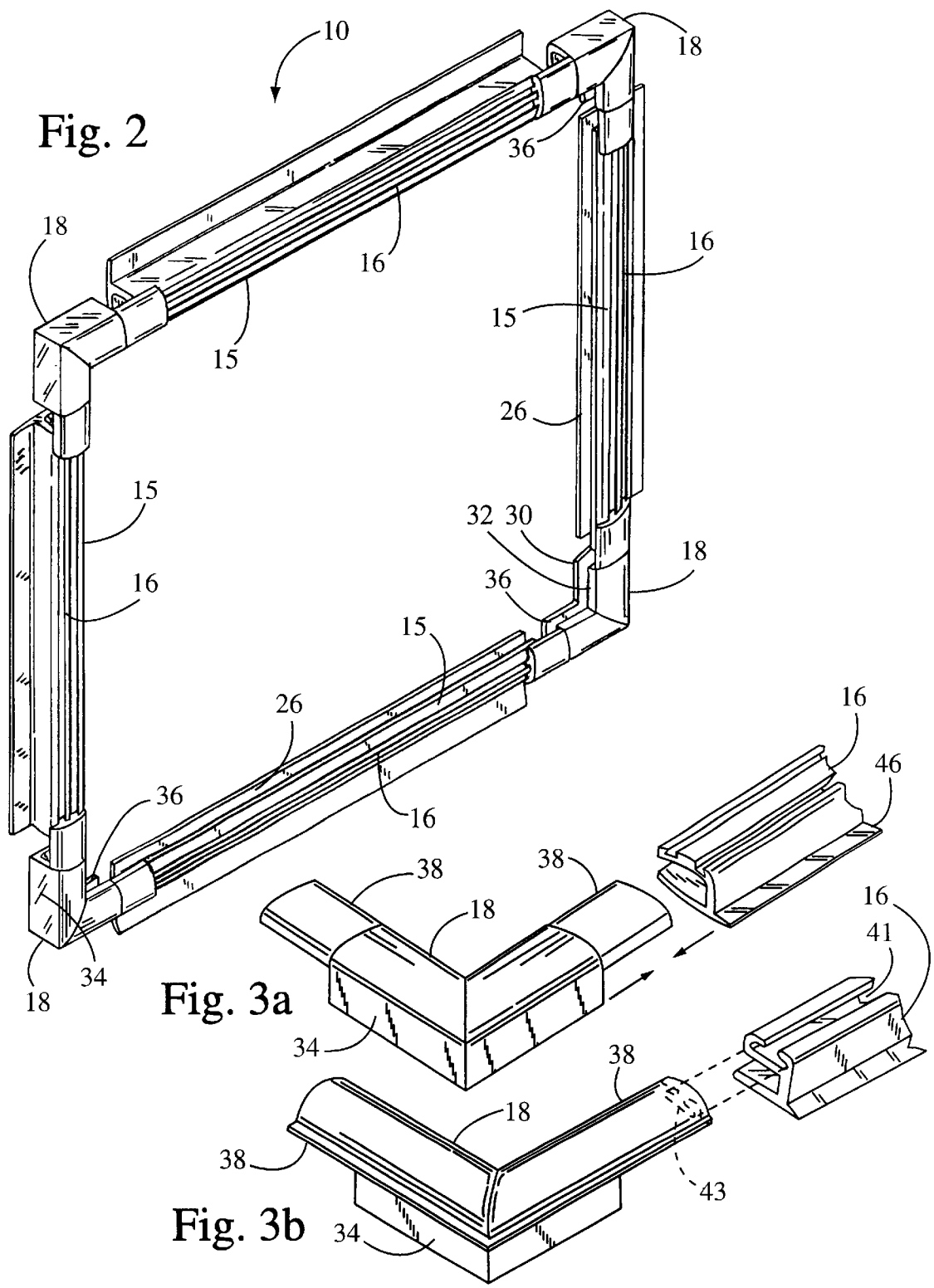

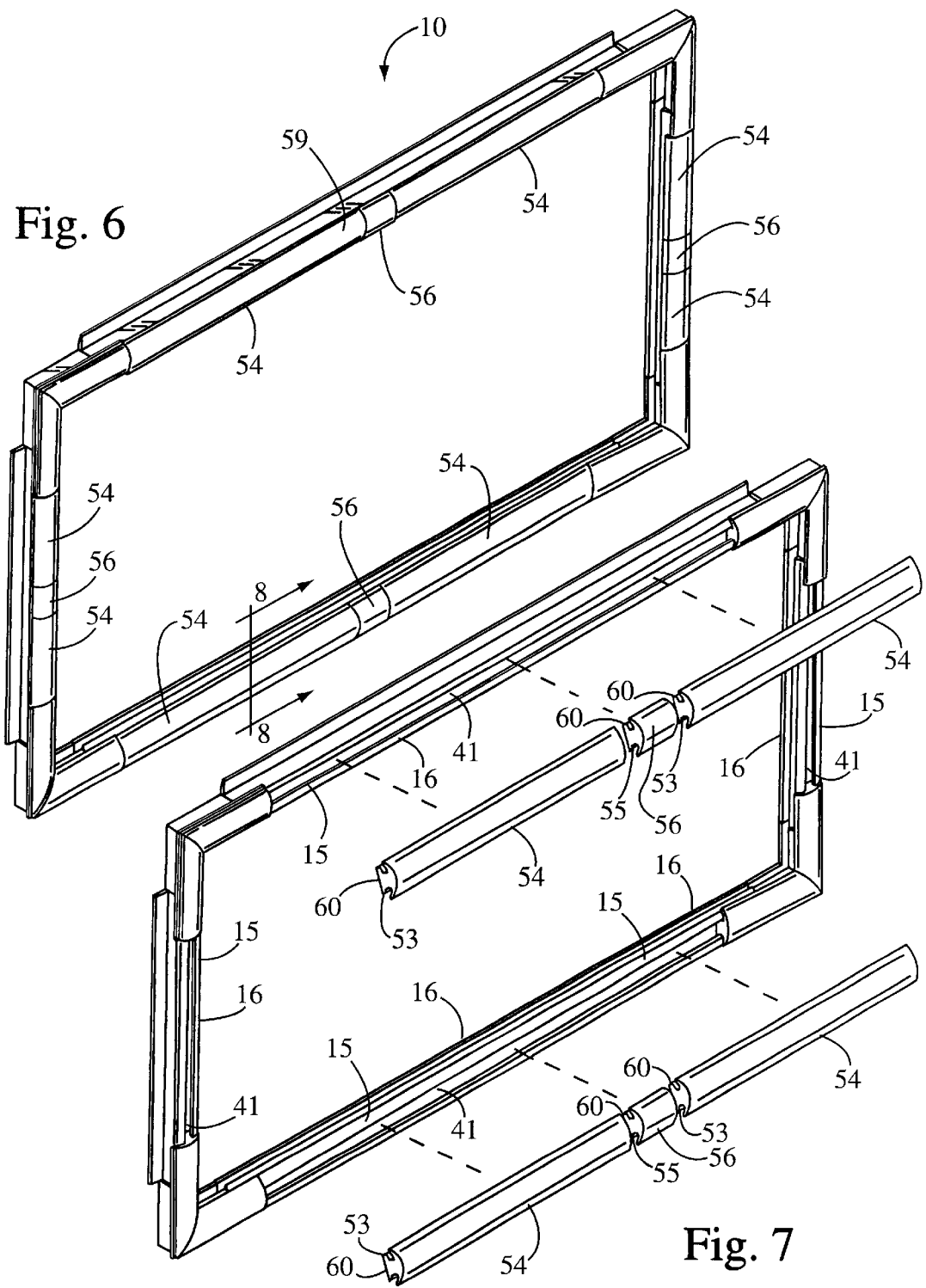

US 6,377,320 B1

SIZE-ADJUSTABLE MOUNTING FRAME FOR TELEVISION SCREEN PROTECTOR

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention relates generally to mounting frames of television screen protectors, and more particularly -to an adjustable. mounting frame able to accommodate variously sized screen protectors in accord with corresponding screen sizes.

BACKGROUND OF THE INVENTION

In recent years there has been a substantial increase in the sales of televisions with larger screens. In many cases these larger screen televisions utilize a projection screen instead of a conventional picture tube to minimize cost and enhance picture quality. Due to the nature of their construction, however, these projection screens are vulnerable to damage from inadvertent impact or scratching during routine cleaning. Consequently, screen protectors were developed to prevent accidental contact and to minimize cleaning frequency.

A screen protector typically comprises a transparent planar shield sized to extend over the surface of a television projection screen, as non-limitedly exemplified by Ananian in U.S. Pat. No. 4,907,090. The planar shield is generally fitted with a mounting frame for attachment to the television housing with fasteners such as standard hook and loopdevices. Additionally, it is very desirable to construct the shields from non-glare materials in order to reduce reflections from ambient lighting. Unfortunately, currently frame designs may encourage optical distortion of television images when the shield is constructed from non-glare materials. Specifically, non-glare shields have a greater tendency to blur or cloud television images as the shield is positioned further from the projection screen.

As a consequence, those frame designs which require separate mounting fasteners may be incompatible with non-glare screen protectors because the fasteners placed between the television housing and mounting frame increase the distance between the projection screen and the shield. Concurrently, separate mounting fasteners also create a gap between the television housing ad the mounting frame through which light may shine or shadows may extend at an angle which obscures the television projection images. The gap may also allow ambient dust to infiltrate and obscure projection images.

In addition to optical distortion, current mounting frames tend to increase the production cost of screen protectors because frame size is non-adjustable, and a particular frame is compatible with just one planar shield and television screen size. This lack of frame size adjustability forces manufacturers to either inventory larger quantities of mounting frames in each size, or increase delivery lead time to accommodate customized fabrication on a per order basis.

In view of the above considerations a primary object of the present invention is to provide a screen protector mounting frame that positions the planar shield thereof closer to the television projection screen and thereby facilitates the use of non-glare materials for the screen protector.

Another object of the present invention is to provide a screen protector mounting frame which blocks shadows, light, and dust from passing between the mounting frame and the television housing.

Yet another object of the present invention is to provide an adjustable mounting frame which accommodates a variety of planar shields and consequent projection screen sizes.

These and other objects of the present invention will become apparent throughout the description thereof which now follows.

SUMMARY OF THE PRESENT INVENTION

The present invention is a size adjustable mounting frame for encompassing a television screen protector and fastening the so-framed screen protector to a television housing to extend over the television projection screen. The adjustable mounting frame comprises a plurality of frame members equal to the number of longitudinal edges of the television screen protector. Each of the frame members has a first end, a second end, at least one engager for attaching the frame member to an edge of the screen protector, and at least one retainer member for attaching the frame member to a television housing receptor member. The adjustable mounting frame also includes a plurality of angled connector members for connecting adjacent respective end portions of the frame members to each other and angled to be complimentarily shaped to corresponding angles of screen protector edges. Each connector member comprises a first end and a second end wherein each end thereof is configured to slideably accept a selected length of the end portion of one frame member. This selected length is determined by the length of the screen protector edge engaged by the frame member in accord with the size of the screen protector. The mounting frame can also be provided with an attached facade to enhance the visual appeal of the frame and television.

The adjustable mounting, frame here taught thus provides adjustment of the frame to accommodate many of the various screen protector sizes. Additionally, the mounting frame positions the screen protector closer to the television projection screen, thereby permitting the use of non-glare screen protectors without distorting television images. In this manner the adjustable mounting frame reduces screen protector production costs and it facilitates the use of non-glare materials for the screen protector.

BRIEF DESCRIPTION OF THE DRAWINGS

An illustrative and presently preferred embodiment of the invention is shown in the accompanying drawings in which:

FIG. 2 is a front perspective view of the size adjustable mounting frame;

FIG. 3A is a perspective view of a frame member and a compatible connector member of the mounting frame;

FIG. 3B is a perspective view of an alternative frame member configuration and a compatible connector member;

FIG. 6. is a perspective view of a mounting frame provided with attached facade segments and facade adjusters;

FIG. 7 is a perspective view of the mounting frame of FIG. 6 showing the facade segments and facade adjustors prior to attachment on the mounting frame.

DETAILED DESCRIPTION OF THE PREFERRED EMBODIMENT

Figure 1:
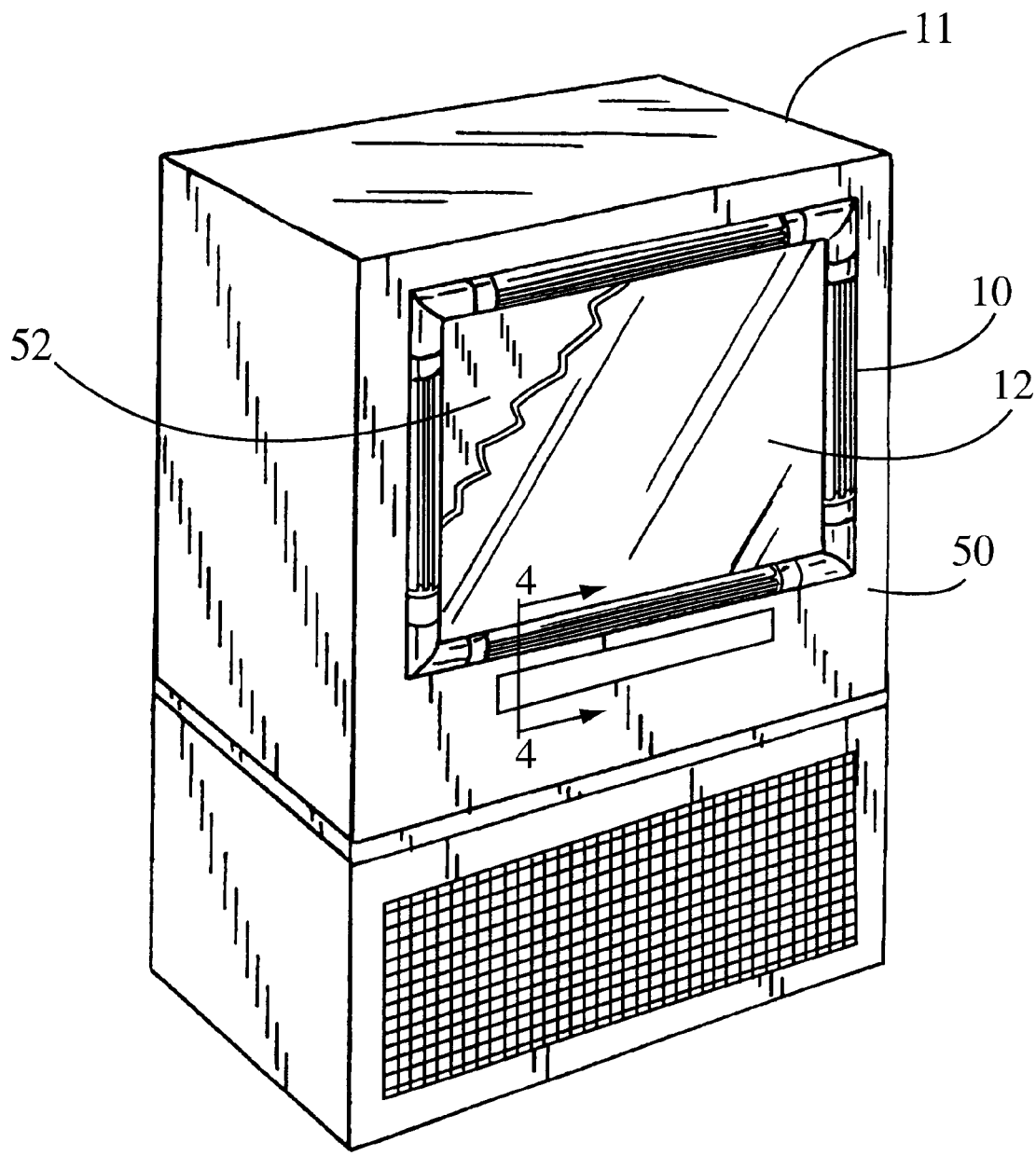
FIG. 1 is a partial cross-sectional perspective view of a size adjustable mounting frame encompassing a screen protector and affixed over a television projection screen.

Referring to FIG. 1, there is shown a television 11 equipped with a size adjustable mounting frame 10 for a television screen protector 12. The mounting frame 10 is secured to the television housing 50 and surrounds the television projection screen 52. Referring to FIG. 2, the mounting frame 10 comprises longitudinal frame members 16 and angled connector members 18 which fasten onto the perimeter of the screen protector 12. As particularly shown in FIGS. 2 and 4, each frame member 16 comprises a pair of opposed panels 20,. 22 interconnected by a bottom panel 24 to form a channel 26 (an engager component) sized for accepting one longitudinal edge 28 of the screen protector 12. The opposed panels 20, 22 are non-limitedly formed from a resilient material such as polyethylene, and at least one of the opposed panels is oriented to apply a compressive spring force upon the edge 28 of the screen protector 12. Similarly, each connector member 18 comprises a pair of opposed panels 30, 32 interconnected, by a bottom panel 34 to form a channel 36 (an engager component) sized for accepting one corner of the screen protector 12. The opposed panels 30, 32 are non-limitedly formed from a resilient material such as polyethylene, and at least one of the opposed panels is oriented to apply a compressive spring force upon the corner of the screen protector 12.

Figure 5:
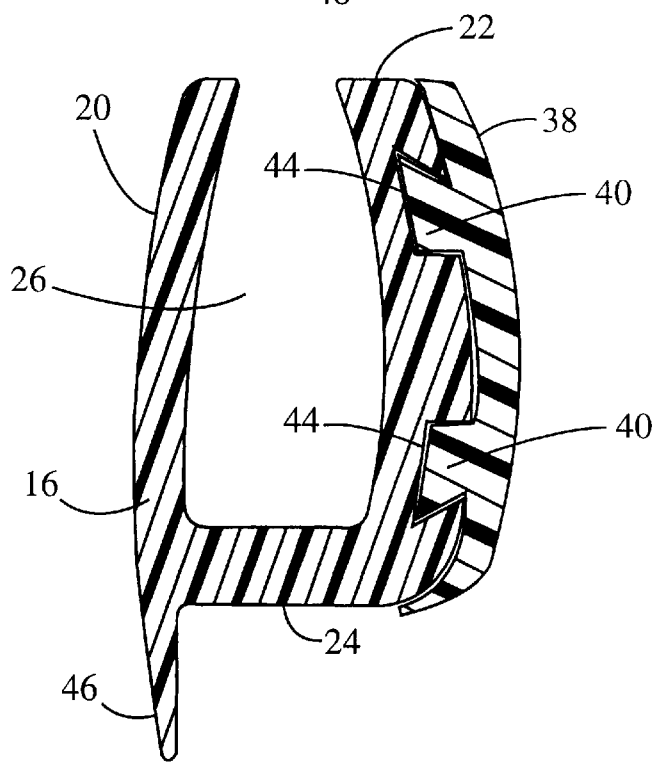
FIG. 5 is a cross-sectional view of a tongue and groove engagement between a frame member and a connector member.
Figure 8:
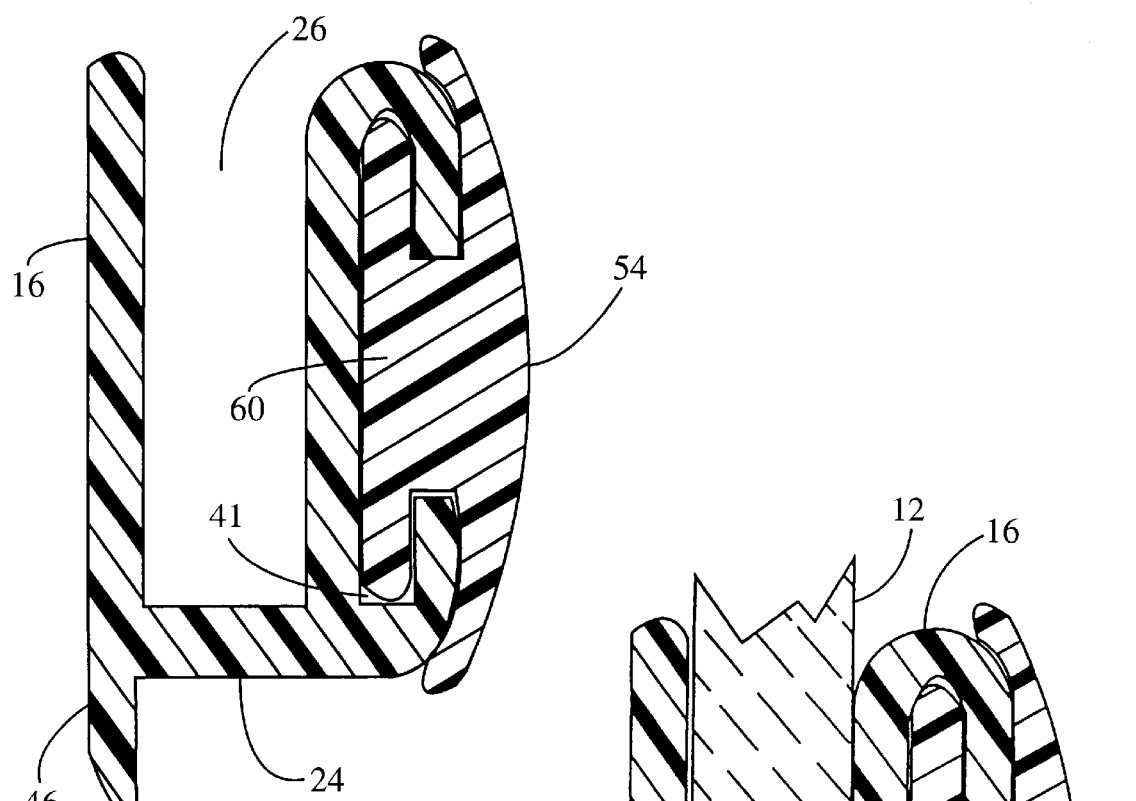
FIG. 8 is a cross-sectional view along line 8—8 of FIG. 6.

Referring to FIGS. 3A and 5, an adjustment flange 38 is disposed on each end of the connector members 18 to facilitate a connection with the frame members 16. The inner surface of the adjustment flange 38 has a pair of longitudinally disposed tapered rail projections 40 which serve as the male half of a dovetailed sliding tongue and groove joint. The outer surface 15 of each frame member 16 has tapered grooves 44 shaped to mate with the rail projections 40, and longitudinally disposed to substantially align with the rail projections 40, to form the female half of a dovetailed sliding tongue and groove joint. With this method of attachment, the combined length of the frame member 16 and connector member 18 can be adjusted to match the length of the screen protector edge 28 by inserting a selected length of the frame member 16 into the adjustment flange 38. It is, of course, recognized that the frame members 16 and connector members 18 can be formed into other shapes which facilitates length adjustable engagement. For example, FIGS. 3B and 8 show a frame member 16 having a T-shaped slot 41 for engaging a compatible T-shaped projection 43 disposed on the connector member 18.

Figure 4:
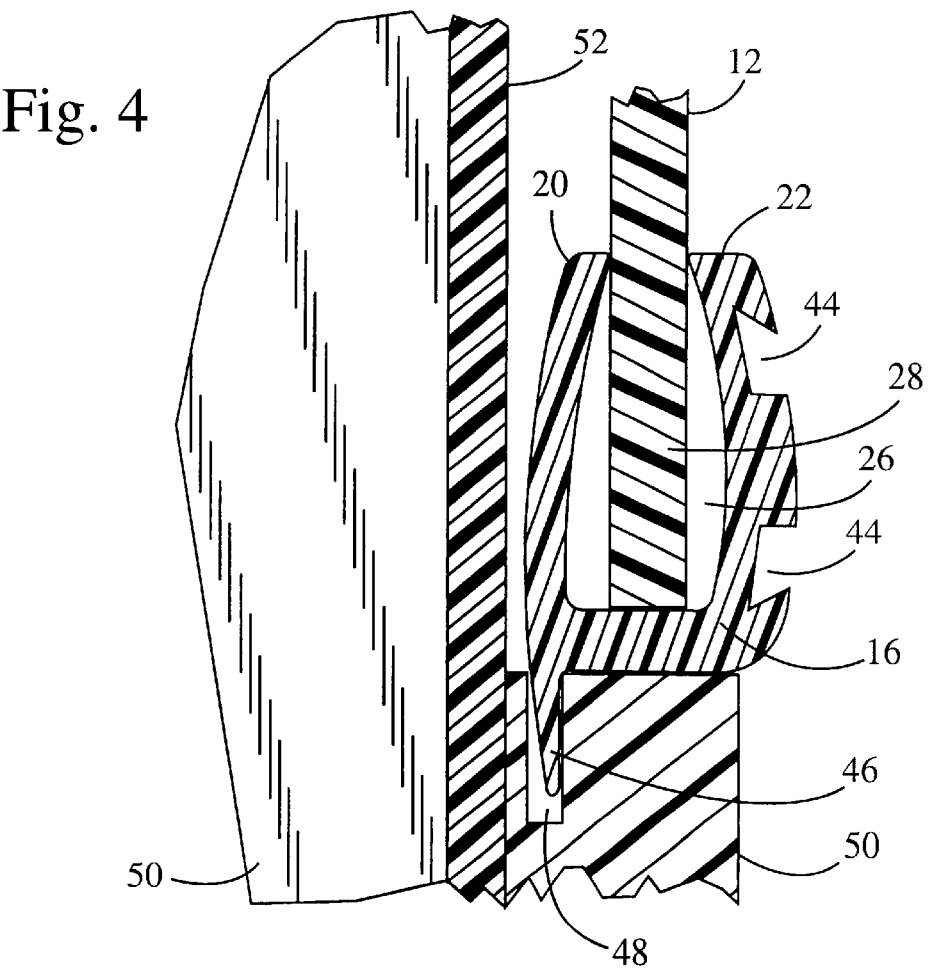
FIG. 4 is a cross-sectional view along line 4—4 of FIG. 1 showing a mounting flange integrally attached to the frame member and engaged within a recess disposed on a television housing.

As shown in FIGS. 4 and 5, each frame member 16 has mounting flange 46 (retainer member) extending along the entire length of the frame member 16 and having a thickness and depth to fit within a recess 48 (receptor member) in the television housing 50. When attached in this manner, the adjustable mounting frame 10 can be placed in a substantially flush position with the television housing 50, and as a consequence, the screen protector 12 can be positioned closer to the television projection screen 52. This configuration facilitates the use of non-glare materials for the screen protector 12. In addition the mounting flange 46 blocks shadows, light, and dust. from passing between the frame member 16 and the television housing 50.

Referring to FIGS. 6 and 7, the mounting frame 10 5 can be provided with facade segments 54 and facade adjusters 56 which are attachable to the frame members 16 to form a facade 58 in combination with the connector members 18. As particularly shown in FIG. 6, the segments 54 and adjusters 56 can be shaped to provide a facade 58 having a substantially uniform exposed surface 59. The facade segments 54 and facade adjusters 58 are also preferably formed from the same material as the connector members 18 such that the facade 58 will have a substantially uniform appearance as well. In addition, the length of the adjustors 56 is selected so the perimeter dimensions of the facade 58 match the perimeter dimensions of the mounting frame 10. To facilitate assembly of the facade 58, the bottom surface 53 of the segments 54 and the bottom surface 55 of the adjusters 56 are shaped for cooperatively engaging the outer surface 15 of the frame members 16. As shown in FIG. 7, the segments 54 and adjusters 56 can be provided with a T-shaped projection 60 for cooperatively engaging the T-shaped slot 41 disposed on the outer surface 15 of the frame members 16. It is recognized, of course, that the segments 54, adjustors 56, and frame members 16 can be provided with other types of cooperatively engageable surfaces. For example, the bottom surface 53 of the segments 54 and the bottom surface 55 of the adjusters 56 can be provided with pin-type projections for engaging compatible perforations in the outer surface 15 of the frame members 16, or visa-versa.

Figure 9:
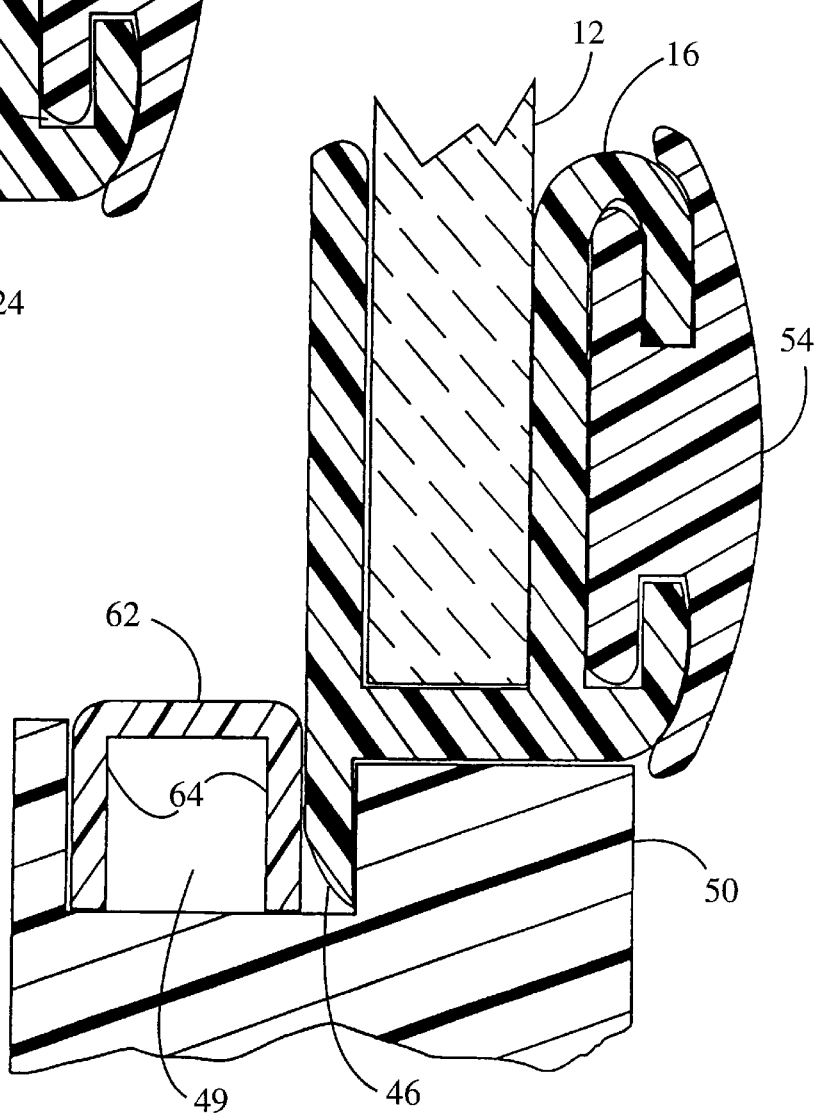
FIG. 9 is a cross-sectional view of a mounting flange fastener positioned for securing the mounting flange of the frame member within an enlarged recess of the television housing.

As shown in FIG. 9, the mounting frame 10 can also be provided with a plurality of mounting flange fasteners 62 for securing the mounting flange 46 of the frame member 16 within an enlarged recess 49 of the television housing 50. The fasteners 62 can be formed in a U-shape and sized such that the legs 64 of the fasteners 62 provide a compressive spring force against the mounting flange 46 and television housing 50. It is recognized, of course, that various types of fasteners 62 can be provided for securing the mounting flange 46 within the recess 48. For instance, the fasteners 62 can be an insertable plugs formed from a compressible material such as rubber for placement within the recess 49 in a compressed position adjacent the housing 50 and mounting flange 46. Alternatively, the fastener can be a set screw penetrating through the housing 50 to engage the mounting flange 46 within the recess 49, etc.

In use, the size adjustable mounting frame 10 is assembled by first inserting one edge 28 of the screen protector 12 into the channel 26 of a frame member 16. The adjacent corner of the screen protector 12 is similarly inserted, into the channel 36 of the connector member 18. A selected length of the frame member 16 is then inserted into the adjustment flange 38 for adjusting the combined longitudinal length of the frame member 16 and connector member 18 assembly to fit the longitudinal dimension of the screen protector 12. This assembly process is repeated until the mounting frame 10 encompasses the screen protector 12. After assembly is completed, the mounting frame 10 is positioned for inserting the respective a mounting flanges 46 into the television housing recesses 48 and fastening the frame and screen protector assembly to the television housing 50. In those instances where the recesses 48 are too large for retaining the mounting flange 46, the mounting flange fasteners 62 can be inserted within the recesses 48 to compressively secure the mounting flange 46 within the recess 48.

When the optional facade segments 54 and facade adjustors 56 are provided with the mounting frame 10, the segments 54 and adjustors 56 are attached to the frame members 16, by connecting the respective engageable surfaces of the segments 54 and adjusters 56 with the compatible mating surface of the frame members 16. When the segments 54 and adjusters 56 are configured for sliding engagement with the frame members 16, the segments 54 and adjustors 56 are attached to the frame members 16 prior to connecting the frame members 16 with the connectors 18.

As is apparent from the above embodiment, the adjustable mounting frame resolves many of the deficiencies in the prior art by (1) facilitating the use of non-glare screen protector materials by eliminating the need for separate mounting fasteners and positioning the screen protector closer to the projection screen, (2) utilizing mounting flanges which block shadows, light, and dust from passing between the frame members and the television housing, and (3) providing an adjustable frame design to accommodate many of the available screen protector sizes and thereby reduce production costs.

While a preferred embodiment has been described herein, it is to be understood that the inventive concepts may be otherwise variously embodied and employed. The appended claims are intended to be construed to include such variations except insofar as limited by the prior art.

What is claimed is:

1. A size adjustable mounting frame for encompassing a television screen protector having a plurality of longitudinal edges and respective interfacing angled corners equal in size and number to respective edges and interfacing angled corners of a television screen to be protected, and for fastening said screen protector to a television housing having a receptor member for mounting frame acceptance and surrounding said television screen, the frame comprising:

a) a plurality of longitudinal frame members equal in number to the number of edges of the screen protector, with each of said frame members having a first end, a second end, and an engager component for engaging the respective edge of the screen protector;

b) a plurality of angled connector members for connecting adjacent first and second ends of adjacent frame members, with each connector member having identical opposing ends each configured to slideably accept a respective variable portion of said adjacent first and second ends of adjacent frame members and complimentarily configured to accommodate the interfacing angled corner of the screen protector, with each connector member having an engager component for engaging said respective angled corner;

c) a retainer member disposed on each frame member, said retainer member being complimentarily configured with said receptor member of the television housing for releasable securement therewith; and d) wherein each respective end of each connector member has an adjustment flange for slideably accepting a respective variable portion of one frame member.

2. A framed screen protector comprising:

a) a planar screen protector having a plurality of longitudinal edges and respective interfacing angled corners equal in size and number to respective edges and interfacing angled corners of a television screen to be protected;

b) a size adjustable mounting frame encompassing the screen protector for fastening said screen protector to a television housing surrounding a television screen, the mounting frame comprising:

i) a plurality of longitudinal frame members equal in number to the number of edges of the screen protector, with each of said frame members having a first end, a second end, and an engager component for engaging the respective edge of the screen protector;

ii) a plurality of angled connector members for connecting adjacent first and second ends of adjacent frame members, with each connector member having identical opposing ends each configured to slideably accept a respective variable portion of said adjacent first and seconds of adjacent frame members and complimentarily configured to accommodate the interfacing angled corner of the screen protector, with each connector member having an engager component for engaging said respective angled corner;

iii) a retainer member protruding from each frame member, said retainer member being complimentarily configured with a receptor member of a television housing for releasable securement therewith; and iv) wherein each respective end of each connector member has an adjustment flange for slideably accepting a respective variable portion of one frame member.

* * * * *